United States Patent

[11] 3,592,994

[72] Inventor Leslie A. Ford
London, England
[21] Appl. No. 847,805
[22] Filed July 25, 1969
[45] Patented July 13, 1971
[73] Assignee P. R. Mallory & Co., Inc.
Indianapolis, Ind.
[32] Priority Aug. 24, 1965, Jan. 18, 1966
[33] Great Britain
[31] 36291/65 and 2261/66
Continuation of application Ser. No.
573,016, Aug. 17, 1966, now abandoned.

[54] SPOT-WELDING APPARATUS
6 Claims, 18 Drawing Figs.
[52] U.S. Cl. .................................................. 219/119
[51] Int. Cl. ............................................... B23k 9/24,
G23k 11/30
[50] Field of Search ........................................ 219/119,
120

[56] References Cited
UNITED STATES PATENTS
2,180,396 11/1939 Burke ........................... 219/119
2,186,319 1/1940 Bilton ........................... 219/120
FOREIGN PATENTS
620,227 3/1949 Great Britain Primary Examiner—J. V. Truhe
Assistant Examiner—Lawrence A. Rouse ABSTRACT: A spot-welding electrode having a tip with a flat operative contact face and an annular recess surrounding the contact face. The portion of the electrode body which extends beyond the recess is chamfered or tapered away from the contact face. The annular insert is force fit into the recess and extends into the electrode body from the periphery of the contact face. The outer end of the insert provides a flat annular zone which surrounds the contact face and is flush with it so as to constitute essentially a peripheral reinforced flat extension of the face. The insert is formed of a conductive material having greater strength and resistance to deformation under welding conditions than the material forming the contact face. The outer end of the insert is chamfered or tapered beyond the flat annular zone so as to coincide with the chamfer or tapered in the electrode body.

PATENTED JUL 13 1971
3,592,994
SHEET 5 OF 5
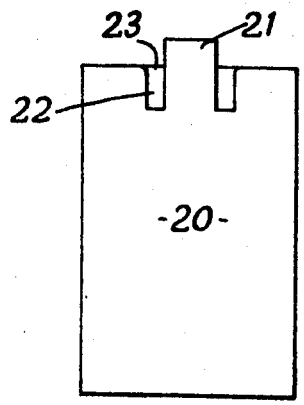
Fig.12A.
Fig.13A.    Fig.13B.    Fig.13C.
        
Fig.13D.    Fig.13E.
    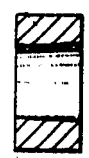
Inventor
Leslie Albert Ford
By Cushman, Darby & Cushman
Attorneys

SPOT-WELDING APPARATUS

This application is a continuation of Ser. No. 573,016 filed Aug. 17, 1966 and now abandoned.

This invention relates to spot-welding electrodes.

Among the properties required of a spot-welding electrode are that it should have good thermal and electrical conductances and that, in use, it should be resistant to deformation, at least at its working end or tip, when subjected to mechanical stress at temperatures equal to or closely approaching the welding temperature at the workpiece. The reasons for this are as follows:

The process of spot welding is commonly used to produce small-area welds between two relatively thin sheets of metal and is generally carried out by clamping the sheets firmly between two axially aligned water-cooled electrodes and then passing a heavy current from one electrode to the other through the sheets. Under these circumstances, resistance heating of the sheets occurs particularly at the interface between them where they are held in contact. This is due to the relatively high electrical resistance between the sheets in the region of contact and in practice the rate of heat generation is such that at least the contiguous surface layers of the sheets in this region are fused, so that on cooling the sheets are welded together. When a pair of sheets is welded together in this way, it is necessary to prevent a similar process occurring at the regions of contact between the electrodes and the sheets. This is done by circulating cooling water through the body of each electrode so as to prevent the temperature of its tip from reaching a value at which it will itself weld to the sheet. Despite this precaution, the temperature of each electrode tip does rise to a value approaching the welding temperature of the sheets during each welding operation.

Further, in order to achieve the necessary contact between the sheets, it is necessary to clamp them together with considerable force by means of the electrodes. It follows that during each welding operation the tip of each electrode is subjected to considerable mechanical stress at temperatures approaching the welding temperature of the workpiece.

For these reasons, at least the tip of a spot-welding electrode must (i) be resistant to deformation at temperatures approaching the welding temperature. Further, such an electrode must (ii) have a high electrical conductance so that it may carry the necessary heavy current without being unduly heated by the passage of the current. Also, the electrode must (iii) have a high thermal conductance so that water-cooling the body of the electrode will effectively cool its working tip.

Unfortunately, these requirements for a spot-welding electrode of high thermal and electrical conductances and good hot strength are to an extent incompatible, since materials such as copper which well satisfy the first two requirements do not satisfy the third whilst materials having particularly good hot strength generally have relatively poor thermal and electrical conductivities.

If a spot-welding electrode is made from a relatively soft (but highly conductive) material, such as copper, the high temperature and pressures to which the electrode tip is subjected in use cause it to spread out or "mushroom" fairly rapidly. When this occurs it becomes necessary to interrupt the sequence of welding operations and to remove the electrode so that its tip may be restored to its original shape. This is generally done by remachining the tip or by "dressing" it with a hand file.

On the other hand, if an electrode is made of a hard, highly deformation-resistant material which has low electrical and low thermal conductivity the current required for welding would, during operation, cause overheating and consequent softening of the electrode material leading to "mushrooming" of the electrode. In extreme cases, the electrode may tend to melt and fuse to the workpiece.

It has accordingly become the practice to use electrodes made of materials whose properties lie intermediate the extremes mentioned above and which have electrical and thermal conductivities comparable with those of copper and strengths at elevated temperatures which are significantly higher. Typical of these materials is a range of chromium-copper alloys, with or without the addition of small quantities of one or more of the metals beryllium, cobalt and Zirconium, which have been developed for the manufacture of spot-welding electrodes. Electrodes made from these alloys are, nevertheless, still prone to "mushrooming", although less than with copper electrodes.

According to this invention a spot-welding electrode includes a reinforcing member or members extending into the electrode from the peripheral zone of contact as herein defined, the member or members being of a material having relatively greater strength and resistance to deformation under welding conditions than conventional electrode materials.

We have found that such a reinforcing member or members considerably reduces "mushrooming."

In one form of spot welding electrode, the tubular reinforcing member is a tightly fitting insert located in the electrode tip so that a part of one end face of the insert coincides with and forms a peripheral zone of the contact face at the working end of the electrode tip.

By "peripheral zone of the contact face" is meant a zone, the outer perimeter of which either coincides with or is near to and conforms closely to the periphery of the contact face.

The resistance to deformation of the insert at elevated temperature and the electrical and thermal conductivity of the electrode material are as high as possible.

Preferably, the insert is cylindrical and the outer periphery of the said one end face is chamfered, tapered, or otherwise shaped to produce a welding tip of the desired profile. It will therefore be appreciated that the insert not only constitutes the peripheral zone of the contact face but also presents the relatively harder material of the insert in that region of the tip adjacent the contact face where "mushrooming" usually occurs.

It is desirable for the conductivity of the insert material to be as high as possible consistent with the need to avoid softening of the insert during operation. For example, in an electrode made from a copper-chromium alloy having a conductivity of 80 percent International annealed copper Standard, we have found that satisfactory operation is obtained using an insert having a conductivity of greater than say, 30 percent International annealed copper Standard.

Where a number of reinforcing members of rod or strip form are used, adjacent members may be located to touch each other or to be spaced apart from each other. In effect, therefore, the members define a tube extending into the electrode from the "peripheral zone of the contact face" and having a continuous or discontinuous surface dependent upon the cross-sectional shape of the reinforcing members and whether or not adjacent reinforcing members touch each other. The tube may be of circular or other cross section and, if desired, the longitudinal section of tube may taper.

The rod or strip reinforcing members may be of circular, rectangular or arcuate cross section. Where the members are of arcuate cross section, these may constitute segments of a cylindrical tube.

Where a single reinforcing member is used, this may be helical. Alternatively the cross section of the reinforcing member taken in a plane normal to the length of the electrode may be a spiral.

It is usual for the tip of a spot welding electrode to be tapered or chamfered and, if desired, the reinforcing member or members may be located slightly inside the inclined surface so formed, or may constitute a part of parts of the inclined surface.

The invention also includes a method of making a spot-welding electrode comprising: forming an annular recess in one end of a billet of electrode material at the peripheral zone of contact; force fitting a tubular reinforcing member into the recess so that the outer end of the member is substantially flush with the zone, the member being of a material having a relatively greater strength and resistance to deformation under welding conditions than conventional electrode materials; and subjecting the billet to compression in a back extrusion press to produce a cavity which constitutes a coolant chamber in the electrode.

Further the invention includes a spot-welding machine having a welding electrode made in accordance with the invention.

Electrodes in accordance with the invention will now be described by way of example, with reference to the accompanying drawings, in which.

Figure 1:
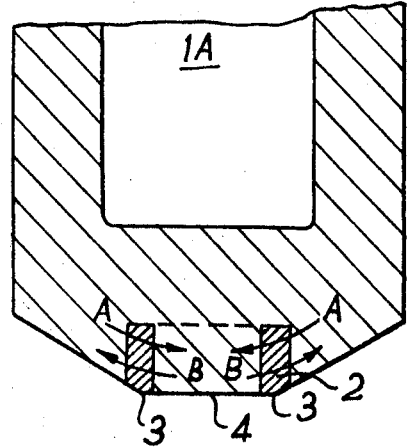
FIG. 1 is a sectional elevation of part of an electrode according to the invention, including the working end.

The body 1 of the electrode, see FIG. 1, is formed of a copper-chromium alloy known as "Mallory 3" ("Mallory" is a Registered Trade Mark) and the working end of the electrode has a force-fitted, hollow cylindrical reinforcing insert 2, the end face 3 of which constitutes an annular, peripheral zone of the contact face 4 of the electrode. The insert 2 is formed of a material known as "Elkonite 30W3" ("Elkonite" is a Registered Trade Mark), and comprises a sintered mass of tungsten particles with the interstices between them filled with copper. The electrode includes a cooling cavity 1A.

Figure 4:
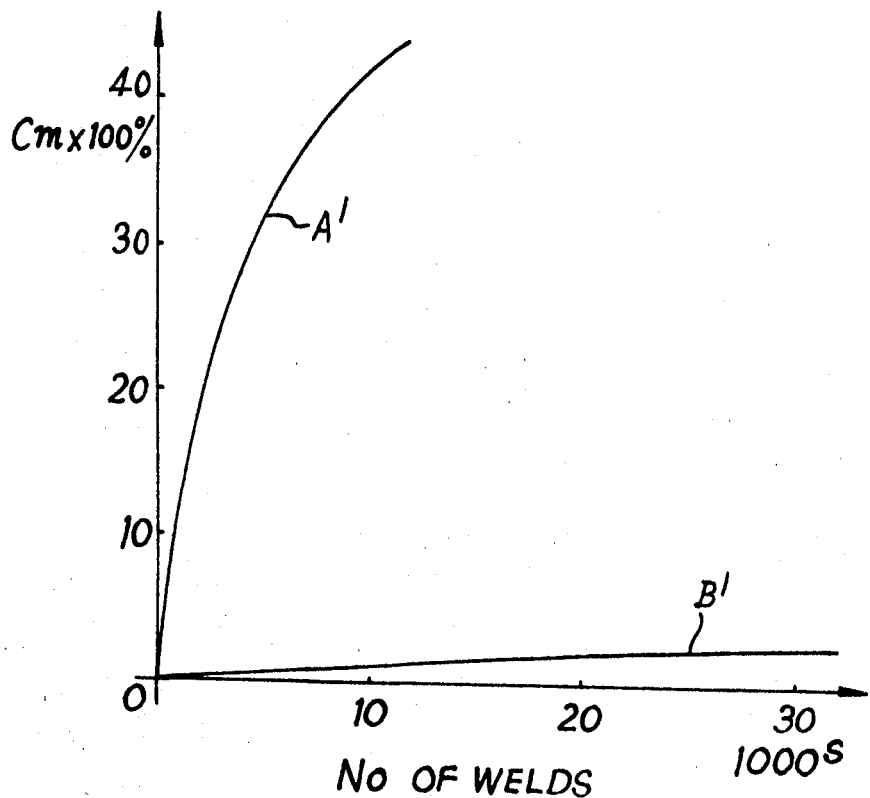
FIG. 4 shows graphically curves of Cm (as herein defined) against number of welds for electrodes with and without reinforcing inserts.

Electrodes of the above type exhibit markedly increased resistance to "mushrooming" in service as compared, for example, with electrodes of the same size and shape made entirely form "Mallory 3" alloy and without the "Elkonite 30W3" insert. Referring to FIG. 4, in tests made to determine the relative resistance to "mushrooming" of "Mallory 3" electrodes with and without "Elkonite 30W3" inserts, pairs of these electrodes were used in an automatic spot-welding machine to join together two strips of EN2B mild steel (a low carbon steel). Care was taken to ensure that the same welding regime was used with each pair of electrodes. After each pair of electrodes had been used for 10,000 welds one electrode of each pair was removed and its percentage "mushrooming coefficient" (Cm) determined.

Figure 5:
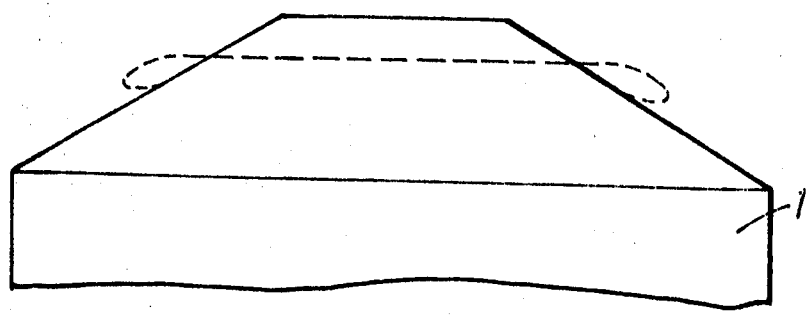
FIGS. 5, 6 and 7 show additional details of electrodes with and without inserts.

By "percentage mushrooming coefficient" is meant $$Cm = \frac{M-T}{M} \times 100\%$$

Where $M$ is the projected area of the "mushroomed" tip of the electrode onto a plane at right angles to the centerline of the electrode and $T$ is the area, projected onto the same plane, which the tip would have had if its length has been reduced, without "mushrooming," by an amount equal to the loss of length occasioned by the "mushrooming" which actually occurred. "Mushrooming" of a tip is diagrammatically shown by the dotted lines in FIG. 5. In FIG. 4, curve A shows the results of the tests on the conventional electrodes and curve B those on the electrodes in accordance with the invention.

After 10,000 welds, the coefficient Cm for a "Mallory 3" electrode with an "Elkonite 30W3" insert was 1½ percent, whereas the coefficient Cm for an electrode made entirely from "Mallory 3" was 42 percent. Further, when the electrode according to the invention was used to make an additional 20,000 welds, the value of its Cm increased by a mere 1 to 2½ percent.

Experience with electrodes according to the invention has shown that the insert should be a tight mechanical fit within the working end of the electrode. The tighter the mechanical fit of the insert in the electrode, the lower the resistance to transverse flow of electricity and heat in the directions A and B (see FIG. 1) and thus, in service the heat is more effectively conducted away from the electrode tip.

Figure 2:
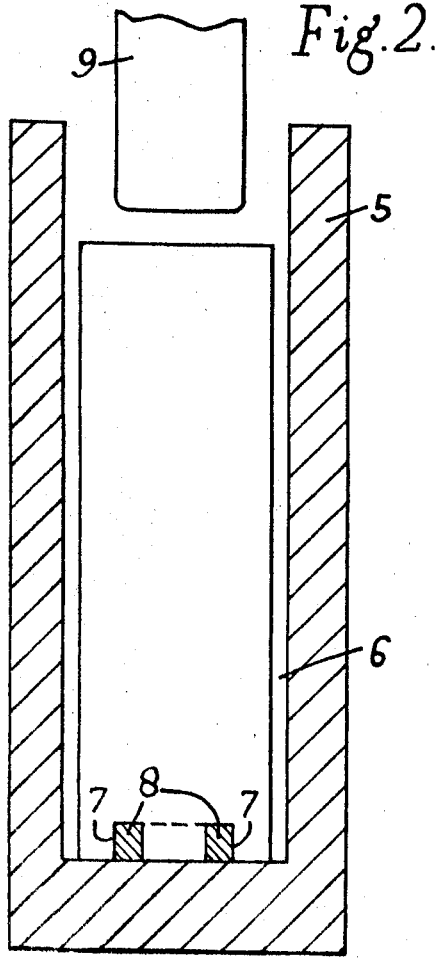
FIGS. 2 and 3 illustrate stages in the manufacture of the electrode.
Figure 3:
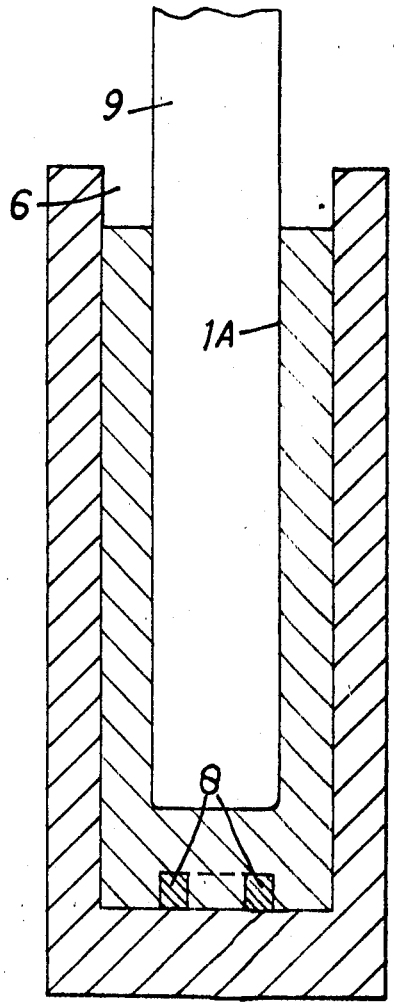

One way of making an electrode according to the invention is illustrated in FIGS. 2 and 3. In FIG. 2, a cylindrical chamber 5 of "Mallory 3" alloy is located within the cylindrical chamber 6 of a vertical "back-extrusion" press. The lower face of the billet 5 has a circular channel 7 into which there has been force fitted (as a preliminary operation) a hollow cylindrical insert 8 of "Elkonite 30W3". The height of the insert 8 is slightly larger than the depth of the channel 7 so that, after extrusion, the insert remains slightly proud of the lower end face of the billet 5, typically by about 0.005 inch. (This is not shown in the FIGS. 2 and 3).

Figure 6:
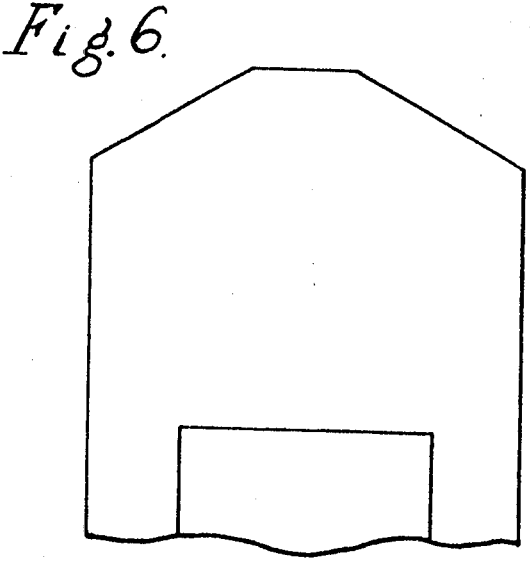
Figure 7:
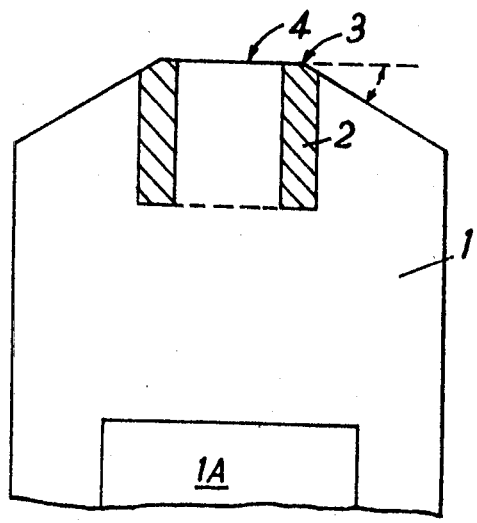

When the billet 5 has been placed in the press as shown in FIG. 2, a plunger 9 is driven into the upper face of the billet so as to deform it into the shape shown in FIG. 3. As shown, the action of the plunger spreads the billet radially until it bears against the inner wall of the chamber 6 and "back extrudes" some of the material of the billet between the plunger and the chamber wall to form the longitudinal cavity 1A within the billet. This cavity, forms the cooling water cavity in the finished electrode. After removal of the deformed billet from the press, the lower end is machined to the shape shown in FIG. 1, and the upper end is tapered to enable the finished electrode to be fitted into a standard electrode holder. Alternatively, instead of forming the cavity by back extrusion, it can be drilled out. The major dimensions of an electrode in accordance with this invention are shown in FIG. 7 and for purposes of comparison a conventional electrode, also dimensioned, is shown in FIG. 6.

Although the embodiment described above refers to the use of "Mallory 3" alloy with a hollow cylindrical insert of "Elkonite 30W3", the electrode may, for example, be made of any of the metals or alloys which are used for the manufacture of spot-welding electrodes and the insert may be of any metallic material which is stronger at elevated temperatures than the material of the electrode into which it is fitted. Of the materials which may be used for the insert, tungsten or molybdenum or alloys consisting principally of either or both of these metals, or materials consisting principally of a sintered aggregate of tungsten or molybdenum particles or both, are particularly suitable.

FIGS. 8 to 11 show other kinds of inserts which may be used in accordance with the invention. In use each of these inserts would constitute a reinforcing member or members extending into the electrode from the peripheral zone of contact, as defined above.

Figure 8:
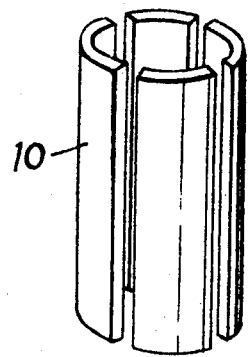
FIGS. 8 to 12 are diagrams showing five further kinds of insert.

FIG. 8 shows an insert consisting of four strips 10 arranged in circular tube formation, each strip being of curved cross section as shown, to constitute a segment of cylindrical tube.

Figure 9:
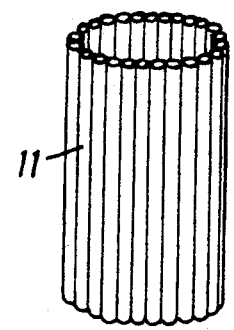

FIG. 9 shows an insert consisting of circular rods 11 arranged in circular tube formation. As shown, the rods touch each other. In a somewhat similar arrangement (not shown) the rods would be spaced apart. Alternatively the rods could be of square or rectangular cross section.

Figure 10:
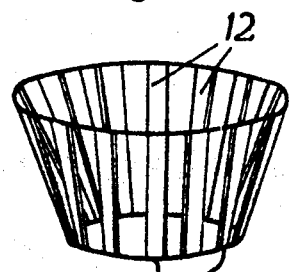

FIG. 10 shows an insert consisting of rectangular rods 12 which are spaced apart from each other in tapered tube formation, the width of the tube formation increasing inwardly of an electrode from its peripheral zone of contact, in which the outer end faces 12A of the rods 12 would lie.

Figure 11:
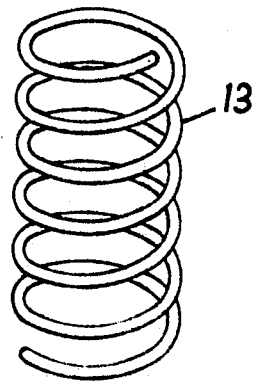

FIG. 11 shows a helical insert 13 and FIG. 12A shows an insert 14 which is spiral in cross section in a plane normal to the length of the electrode, which length is parallel to the axis of the insert 14.

Figure 12:
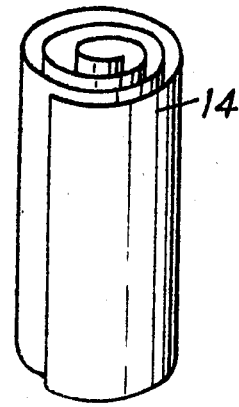

FIG. 12 shows a billet 20 from which an electrode body is formed. The billet 20 has a central projection 21 and an annular recess 22 for receiving a generally tubular reinforcing insert, previously designated 2. To assist, of a cylindrical reinforcing insert, (see FIG 13A), the outer periphery 23 of the annular recess 22 is cut back slightly to form a chamfered beveled or curved edge. To secure the insert in position, the central projection is swaged or peened and, thereafter, the billet is machined to the required shape.

A number of differently shaped reinforcing inserts are shown in FIG. 13. FIG. 13A shows, as mentioned above, a cylindrical insert, FIG. 13B shows a cylindrical insert having the inner periphery 24 of what, when assembled, is the outermost end of the insert cut away at an angle of 30°.

It will be appreciated that by swagging and peening, material from the central projection 21 is forced outwardly against not only the inner surface of the insert but also the triangular sectioned annulus between the insert and the projection by virtue of the bevel 24, thereby securing the insert in the recess 22.

Another modification of the insert is shown in FIG. 13C in which the outer and inner peripheries of what, when assembled, is the innermost end of the insert, are curved.

The insert shown in FIG. 13D is a combination of the inserts shown in FIGS. 13B and C.

FIG. 13E shows an insert having a tapered bore. The taper of the bore is such that the largest diameter is located at what, when assembled, is the outermost end of the insert.

Although swagging and peening, back extruding of the billet around the material, and force-fitting an insert within a recess formed in the billet result in satisfactory thermal and electrical contact between the insert and the billet, such contact may be improved by placing a layer of silver or silver-based alloy between the insert and the recess.

The layer of silver or silver-based alloy may be introduced in the form of a washer placed at the root of the recess. In this way, application of pressure to the insert during force-fitting, back extrusion or swagging will not only cause deformation of the washer material to form good contact between the insert and root of the recess but also a certain amount of back extrusion of the washer material will take place between the inner and outer peripheries of the insert and the walls of the recess.

In an alternative method, the appropriate surfaces of the insert and or the recess may be coated with silver or silver-based alloy.

I claim:

1. A spot-welding electrode comprising an electrode body having a tip with a flat operative contact face and an annular recess surrounding said contact face with the portion of said body extending beyond said recess being chamfered or tapered away from said contact face, a reinforcing member comprising an annular insert force fit into said recess and extending into the electrode body from the periphery of the contact face, the outer end of said insert providing a flat annular zone surrounding said face and flush therewith so as to constitute essentially a peripheral reinforced flat extension of the face, said insert being formed of a conductive material having greater strength and resistance to deformation under welding conditions than the material forming said contact face, the outer end of the insert being chamfered or tapered beyond said flat annular zone so as to coincide with the chamfer or taper in said electrode body.

2. An electrode according to claim 1 wherein the insert consists of a metallic material having an electrical conductivity of not less than 27 percent I.A.C.S.

3. An electrode according to claim 1 wherein the reinforcing member comprises a plurality of rods or strips arranged in circular tube formation.

4. An electrode according to claim 1 wherein the reinforcing member comprises a plurality of rods or strips arranged in tapered tube formation.

5. An electrode according to claim 1 wherein the reinforcing member is helical.

6. An electrode according to claim 1 wherein the reinforcing member is formed of a sintered mass of tungsten particles with the interstices between them filled with copper and the body of the electrode is a copper-chromium alloy.